United States Patent
Lohde et al.

(10) Patent No.: US 12,116,910 B2
(45) Date of Patent: Oct. 15, 2024

(54) LIFT REGULATOR FOR A VARIABLE LIFT VALVE GEAR WITH TWO WORKING POSITIONS

(71) Applicant: Bayerische Motoren Werke Aktiengesellschaft, Munich (DE)

(72) Inventors: Steffen Lohde, Munich (DE); Giovanni Mincione, Munich (DE); Sebastian Sperrhacke, Schweitenkirchen (DE); Din Wabbals, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 17/777,696

(22) PCT Filed: Nov. 11, 2020

(86) PCT No.: PCT/EP2020/081747
§ 371 (c)(1),
(2) Date: May 18, 2022

(87) PCT Pub. No.: WO2021/115711
PCT Pub. Date: Jun. 17, 2021

(65) Prior Publication Data
US 2022/0403762 A1    Dec. 22, 2022

(30) Foreign Application Priority Data

Dec. 9, 2019    (DE) ............. 10 2019 133 590.6

(51) Int. Cl.
*F01L 13/00*    (2006.01)
*F01L 1/053*    (2006.01)
(Continued)

(52) U.S. Cl.
CPC ........... *F01L 13/0063* (2013.01); *F01L 1/053* (2013.01); *F01L 1/185* (2013.01); *F01L 13/08* (2013.01);
(Continued)

(58) Field of Classification Search
CPC ....... F01L 13/0063; F01L 13/08; F01L 1/053; F01L 1/185; F01L 2305/00;
(Continued)

(56) References Cited

U.S. PATENT DOCUMENTS

| | | | |
|---|---|---|---|
| 2,628,605 | A | 2/1953 | Jones et al. |
| 2003/0037739 | A1 | 2/2003 | Wurms et al. |

(Continued)

FOREIGN PATENT DOCUMENTS

| | | |
|---|---|---|
| CN | 1826457 A | 8/2006 |
| CN | 103168154 A | 6/2013 |

(Continued)

OTHER PUBLICATIONS

Chinese-language Office Action issued in Chinese Application No. 202080071236.8 dated Nov. 6, 2023 with English translation (26 pages).

(Continued)

*Primary Examiner* — Kenneth J Hansen
*Assistant Examiner* — Kelsey L Stanek
(74) *Attorney, Agent, or Firm* — Crowell & Moring LLP

(57) ABSTRACT

A lift regulator for a variable lift valve gear has a cam contour arranged around an axis of rotation of the lift regulator for deflecting a lift adjustment of the valve gear on rotation of the lift regulator about the axis of rotation. The cam contour has a region deflecting from a resting position, a changeover region, and a region deflecting back to the (Continued)

resting position. A variable lift valve gear and a method for operating the variable lift valve gear are disclosed.

19 Claims, 5 Drawing Sheets

(51) Int. Cl.
  *F01L 1/18* (2006.01)
  *F01L 13/08* (2006.01)
  *F02D 13/02* (2006.01)
  *F02D 41/14* (2006.01)
(52) U.S. Cl.
  CPC ..... *F02D 13/0269* (2013.01); *F02D 41/1446* (2013.01); *F01L 2013/0068* (2013.01); *F01L 2305/00* (2020.05); *F01L 2820/044* (2013.01)
(58) Field of Classification Search
  CPC ........ F01L 2013/0068; F01L 2820/044; F02D 41/1446; F02D 13/0269
  USPC ....................................................... 123/90.1
  See application file for complete search history.

(56) References Cited

U.S. PATENT DOCUMENTS

| | | |
|---|---|---|
| 2004/0144347 A1 | 7/2004 | Schleusener et al. |
| 2007/0074687 A1 | 4/2007 | Bosl-Flierl et al. |
| 2013/0199472 A1 | 8/2013 | Flierl |
| 2013/0340694 A1 | 12/2013 | Nakamura |
| 2017/0298786 A1 | 10/2017 | Pham |
| 2019/0032524 A1 | 1/2019 | Franke et al. |
| 2022/0090523 A1 | 3/2022 | Clauberg et al. |

FOREIGN PATENT DOCUMENTS

| | | | |
|---|---|---|---|
| CN | 103511016 A | 1/2014 | |
| CN | 104564201 A | 4/2015 | |
| CN | 107288696 A | 10/2017 | |
| CN | 109306917 A | 2/2019 | |
| DE | 19629349 A1 * | 1/1998 | ............. F01L 1/053 |
| DE | 100 16 103 A1 | 10/2001 | |
| DE | 102014013664 A1 * | 3/2016 | ................ F01L 1/12 |
| DE | 10 2015 214 115 A1 | 2/2017 | |
| DE | 10 2018 130 428 A1 | 6/2020 | |
| EP | 1 387 928 B1 | 7/2006 | |
| EP | 2 048 331 A2 | 4/2009 | |
| FR | 2928686 A3 * | 9/2009 | ................ F01L 1/34 |
| WO | WO-0175279 A1 * | 10/2001 | .......... F01L 13/0063 |
| WO | WO 2014/168988 A1 | 10/2014 | |

OTHER PUBLICATIONS

International Search Report (PCT/ISA/210) issued in PCT Application No. PCT/EP2020/081747 dated Feb. 19, 2021 with English translation (six (6) pages).
German-language Written Opinion (PCT/ISA/237) issued in PCT Application No. PCT/EP2020/081747 dated Feb. 19, 2021 (seven (7) pages).
German-language Office Action issued in German Application No. 10 2019 133 590.6 dated Oct. 5, 2020 (six (6) pages).

* cited by examiner

LIFT REGULATOR FOR A VARIABLE LIFT VALVE GEAR WITH TWO WORKING POSITIONS

BACKGROUND AND SUMMARY

The invention relates to a lift regulator, in particular a cam of a camshaft, for a variable lift valve gear, and to a variable lift valve gear for a charge-cycle valve of an internal combustion engine, as well as to a method for operating a variable lift valve gear for a charge-cycle valve of an internal combustion engine.

By virtue of the increasing requirements in terms of low fuel consumption and low emissions, a leaner operation in the entire engine map is increasingly pursued. Applying the Miller combustion method is an important contribution here. By virtue of the reduced tendency toward knocking, the main combustion time can be set earlier, for example by means of a variable camshaft control.

The Miller internal combustion engine is an internal combustion engine which is named after Miller and in which the fuel during the intake procedure is incorporated into the aspirated air, this resulting in an ignitable mixture in the cylinder, as in the case of the four-cycle internal combustion engine. As opposed to the four-cycle internal combustion engine, a Miller internal combustion engine is distinguished by a fifth operating step. The Miller internal combustion engine is therefore also referred to as a "five-cycle engine". The intake valve is closed already during the intake cycle, this leading to an expansion of the mixture up to the end of the intake duct. A lower pressure and temperature in the combustion chamber at the time of ignition result in the subsequent compression phase. This reduces the tendency toward knocking. The consequence of these changes are fewer harmful emissions and a high degree of efficiency of the internal combustion engine.

When an internal combustion engine is to be operated according to the Miller combustion method, the inlet valve lift curve must not exceed a specific opening duration. This short opening duration is significantly shorter than those of internal combustion engines which are operated by the conventional four-cycle process. This typically results in a significantly higher manifold pressure which in turn limits the maximum yield in terms of output.

In terms of the technical field, reference is made, for example, to the European patent document EP 1 387 928 B1. The latter discloses a valve gear device for adjusting a variable lift of a charge-cycle valve of an internal combustion engine, in which the charge-cycle valve, by way of interposing a transmission element, is connected to a roller that is movable about a rotation axis, and a control track comprising a return stroke curve and a lifting curve in an end region of a pivot lever which for activating the lift of the charge-cycle valve is controlled by a camshaft, wherein the pivot lever which in a spring-loaded manner is assigned to the cam by way of a cam track at the other end for the variable adjustment of the lift is supported along a circular track by way of a pivot point that by means of an adjustment installation can be changed in position and can be fixed in a controlled manner. The valve gear device is characterized in that a circular track disposed on a housing part of the internal combustion engine serves as a guide gate having a radius about the rotation axis of the roller of the transmission element of the support, which is variable in length in a controlled manner, of the pivot lever, wherein the control track of the pivot lever is configured in the transition region between the return stroke curve and the lifting curve having a ramp which is adapted to a valve clearance in the valve gear device.

When an internal combustion engine having such a valve gear is to be operated by a combustion method in which a reduced charge-cycle valve lift is prevalent in the range of the maximum output (Miller method), the dynamic limits of the valve gear are not fully utilized because the maximum charge-cycle valve lift must also be obtainable at the maximum rotating speed.

A variable lift valve gear in which the pivot lever (therein referred to as an intermediate lever) is pivoted by an eccentric is known from DE 10 2015 214 115 A1, the eccentric having a bearing region so that a functionally reliable maximum charge-cycle valve acceleration results where the latter is functionally expedient.

In order for the requirements in terms of load cycles to be achieved in the best possible manner, the control cross section (area below the valve lift curve) at a given maximum opening duration has however to be maximized. In order to nevertheless obtain a mechanically robust valve gear at the required maximum rotating speed of the motor, the valve accelerations in terms of the maximum, minimum and profile thereof are however limited in known valve gears of the type described above. The two parameters, i.e. the valve opening duration and the limited valve acceleration, result in a maximum implementable control cross section and valve lift.

Against this background, it is an object of the invention to improve a variable lift valve gear for a charge-cycle valve of an internal combustion engine.

This object is achieved by a lift regulator for a variable lift valve gear, by a variable lift valve gear, as well as by a method for operating a variable lift valve gear, having the features of the independent claims. The dependent claims relate to advantageous refinements of the invention.

Proposed according to one aspect of the invention is a lift regulator for a variable lift valve gear, wherein the lift regulator has a cam contour disposed about a rotation axis of the lift regulator, in particular in the circumferential direction about the rotation axis, for deflecting a lift adjustment of the valve gear. The deflection of the lift adjustment takes place in particular in a radial direction in terms of the rotation axis and/or in particular at a fixed circumferential angular position about the rotation axis, at which circumferential angular position contact with the lift adjustment is provided in a rotation of the lift regulator about the rotation axis. The cam contour has a deflection region, a diversion region, and an inflection region.

A deflection region of the cam contour is in particular to be understood to be that circumferential region of the cam contour by way of which the lift adjustment is deflected when the latter by way of the movement thereof deflects the charge-cycle valve from the resting position thereof (the closed position) by a maximum lift in the conventional operation or a maximum lift in the Miller operation. An inflection region of the cam contour is in particular to be understood to be that circumferential region of the cam contour by way of which the lift adjustment is deflected when the latter by way of the movement thereof inflects the charge-cycle valve to the resting position thereof (the closed position) by a maximum lift in the conventional operation or a maximum lift in the Miller operation. A diversion region of the cam contour is in particular to be understood to be that circumferential region of the cam contour by way of which the lift adjustment is deflected when the latter by way of the movement thereof switches the charge-cycle valve in the region of the maximum deflection thereof by a maximum lift in the conventional operation or a maximum lift in the Miller operation such that, after the deflection away from the resting position, the movement toward the resting position commences again.

Furthermore, the cam contour has a deflection switchover compensation region between the deflection region and the diversion region and/or an inflection switchover compensation region between the diversion region and the inflection region. During a rotation about the rotation axis, in particular at an at least substantially constant rotating speed for the revolution, an absolute value of a gradient of a variation of a valve lift guide variable of the lift regulator in an, in particular each, switchover compensation region here is smaller than in the deflection region and in the diversion region.

A switchover compensation region (thus either the deflection switchover compensation region or the inflection switchover compensation region) is in particular a region, in particular a circumferential region, of the cam contour of the lift regulator within which the contact point with the lift adjustment lies in a rotation of the lift regulator about the rotation axis thereof when the operating curve bears on the lifting lever at a maximum lift in the conventional operation, or at a maximum lift in the Miller operation in the region of the maximum curvature of the operating curve, in order to deflect or inflect, respectively, the charge-cycle valve. Using the example of the deflection, this is the case "earlier" in the switchover compensation region in a conventional operation, and "later" in the switchover compensation region in a Miller operation. A larger control cross section can thus be achieved in the conventional operation, while a small control cross section can be achieved in the Miller operation.

According to one embodiment, the lift regulator is configured as a cam of a camshaft, wherein the valve lift guide variable is a radius of the cam contour of the cam along a circumferential surface of the cam. According to one embodiment, the gradient is an acceleration of an envisaged contact point between the cam contour of the cam and the lift adjustment, the latter being in particular configured so as to have or to be an intermediate lever, during a rotation of the cam conjointly with the camshaft about the rotation axis of the latter.

According to one embodiment, the valve lift guide variable is a radius of the cam contour along a circumferential surface of a cam of a camshaft. A development of the radius is in particular a variation of the radius in the circumferential direction of the cam contour. This variation of the radius comes to bear in particular at a contact point between the cam contour and the lift adjustment, when the cam contour rotates at the rotating speed of the camshaft about the rotation axis of the latter.

When the lift regulator is not embodied as a cam, the gradient of the valve lift guide variable according to one embodiment is in particular that variation of the valve lift guide variable in that direction of movement of the lift regulator that is crucial for the movement of the lift adjustment or of the charge-cycle valve, respectively.

A switchover compensation region of the cam contour is in particular understood to be a circumferential region of the cam contour that is specified and provided for making available the maximum acceleration of the charge-cycle valve of the internal combustion engine in both operating positions of a lift adjustment of the valve gear.

Having a lift regulator, in particular a cam, configured in such a manner, a predetermined ratio of the maximum valve accelerations in a conventional operation, on the one hand, and in a Miller operation, on the other hand, can be ensured. In a portion of the crank movement determined by the circumferential angle of the switchover compensation region, a variable lift valve gear having such a lift regulator can be used without modifications in terms of construction in engine concepts having different lift ratios in the conventional operation, on the one hand, and the Miller operation, on the other hand.

Provided in particular to this end is a value (thus an absolute value) of an average gradient of the variation of the valve lift guide variable in the deflection switchover compensation region, or in the inflection switchover compensation region, respectively, of at most two thirds or half, in particular at most one fifth, one eighth or one tenth, of the gradient of the valve lift guide variable of the adjacent deflection or inflection region, respectively, of the cam contour, so as to enable a desired ratio of the maximum valve accelerations in the conventional operation, on the one hand, and in the Miller operation, on the other hand. The gradient ratios mentioned relate in particular to an average gradient in the switchover compensation region and to a maximum value or an average value of the gradient in the relevant adjacent region.

Proposed according to a further aspect of the invention is a variable lift valve gear for a charge-cycle valve of an internal combustion engine. The internal combustion engine can be a gasoline engine or a diesel engine, for example.

The variable lift valve gear has a lift adjustment having an operating curve which can be disposed at least in a first operating position for adjusting a partial lift and in a second operating position for adjusting a maximum lift, wherein the operating curve has a maximum curvature in one region.

The variable valve gear moreover has a lift regulator which has a cam contour for deflecting the lift adjustment.

The variable valve gear furthermore has a lifting lever which can be deflected by means of the operating curve and as a result thereof can adjust a lift of the charge-cycle valve, wherein the operating curve of the deflected lift adjustment can adjust the charge-cycle valve in particular when running across a contact face of the lifting lever.

According to this aspect of the invention, the valve gear, in particular the lift regulator when interacting with, in particular, a maximum curvature of the lift adjustment, is specified for adjusting the charge-cycle valve at a mutual ratio of the maximum valve accelerations in the first operating position and the maximum valve accelerations in the second operating position, wherein the ratio is a function of the gradient of the variation of the valve lift guide variable of the lift regulator in the switchover compensation region.

According to one embodiment, the valve gear, in particular the lift regulator when interacting with, in particular, a maximum curvature of the lift adjustment, is specified for adjusting the charge-cycle valve so as to have an at least substantially identical maximum valve acceleration in the first operating position and in the second operating position in order to enable an ideally wide potential application of the valve gear across different engine concepts.

The cam contour of the lift regulator is in particular specified for displacing the lift adjustment, in particular the operating curve, by way of a ratio of a speed of the lift adjustment in the first operating position and a speed of the lift adjustment in the second operating position, wherein the ratio is a function of the gradient of the variation of the valve lift guide variable of the lift regulator in the switchover compensation region. This can be achieved by a lift regulator according to the invention without further modification, for example, when the lift adjustment is deflected about a fixed deflection axis. Should this not be the case, an effect of the movable deflection axis of the lift adjustment has to be taken into account in particular when configuring the cam contour of the lift regulator. A movement of the contact point of the cam contour with the lift adjustment is in particular to be conceived such that a displacement of the contact point has to be provided by virtue of the pivot point being adapted for the Miller operation.

In order for the valve gear to be specified, and in particular in order for the cam contour of the lift regulator as well as a cam contour interface, the deflection axis and the operating curve of the lift adjustment, to be mutually adapted, the person skilled in the art may use tools known per se for optimizing the topology of drive components. This procedure has proven to be more results oriented than a trial and error approach such as would be used when adapting a cam contour of the lift regulator (for example the cam contour of a cam of the camshaft) in an iterative manner, for example. The contour of the individual components participating in the movement of the valves here is usually influenced indirectly by way of the motion parameters (e.g. the valve lift versus the cam angle).

The approach according to the invention here includes the solution to a multi-faceted problem: in order for the valve gear to be designed according to the invention, the valve gear must enable an at least substantially identical maximum valve acceleration in both operating positions. To this end, the contours of the lift regulator (cam contour), of the lift adjustment (including the operating curve), and of the lifting lever must be mutually adapted.

At a specific rotating speed of the lift regulator (for example of the camshaft), the valves thus have to be accelerated in particular at an identical maximum acceleration—independently of the positioning of the operating curve in the first operating position or in the second operating position.

In one typical design embodiment of the valve gear, the lift adjustment according to one embodiment is an intermediate lever (also referred to as a pivot lever) which is mounted so as to be able to slide on a guide gate track of a guide gate, on the one hand, and on the other hand has the operating curve, wherein the intermediate lever by a second adjustment device is displaceable along the guide gate track.

In one typical design embodiment of the valve gear, the lifting lever according to one embodiment is an intermediate element such as, for example, a roller cam follower, by way of which the operating curve is operatively connected to the charge-cycle valve.

In one typical design embodiment of the valve gear, the lift regulator according to one embodiment is a first adjustment device, in particular a cam of a camshaft, for pivoting the intermediate lever, counter to a spring force of a spring element, about a guide gate proximal point.

Proposed according to one further aspect is a method for operating a variable lift valve gear for a charge-cycle valve of an internal combustion engine, wherein the valve gear can be configured according to an embodiment of the invention.

The method comprises at least the following steps: (i) determining an exhaust gas temperature in an operating situation of the internal combustion engine; (ii) determining whether the valve gear in the operating situation is to be switched to a conventional operating mode or to a Miller operating mode, wherein the operating mode to be switched is determined as a function of the determined exhaust gas temperature.

The exhaust gas temperature is determined at an engine-distal end of an exhaust manifold and/or in the catalytic converter and/or at a turbine inlet of a turbine of an exhaust gas turbocharger of the internal combustion engine, in particular having a variable turbine geometry. The valve gear is switched to the Miller operating mode when a limit value of the exhaust gas temperature is reached or exceeded. It can in particular be ensured in this way that the internal combustion engine if necessary is operated in an operating mode which enables temperature-critical component parts of the exhaust path, and in particular of a turbine of an exhaust gas turbocharger and/or of a catalytic converter, to be protected.

The thermal inertia of the temperature-critical component parts in this instance can in particular also be utilized so that switching first takes place to a conventional operation, this enabling a higher output, or the latter to be reached more rapidly, respectively, and switching takes place to the Miller operation before a temperature level that is critical in terms of the exhaust gas turbocharger turbine and/or the catalytic converter is reached. Since the manifold pressure requirement in the Miller operation always exceeds that of the conventional operation, this manifold pressure requirement is to be provided as a protective function for temperature-critical component parts when required.

To this end, the limit value of the exhaust gas temperature according to one embodiment is determined as a function of a material characteristic, in particular of a heat resistance of a turbine material and/or of an exhaust path material of the exhaust gas turbocharger.

Additionally or alternatively, the method comprises at least the following steps: determining an exhaust gas temperature and/or an indicator of at least one other temperature parameter of the internal combustion engine; determining an operating mode to be switched, in particular a conventional operating mode or a Miller operating mode, as a function of the determined temperature; and switching the lift adjustment to the first operating position or to the second operating position of the operating curve as a function of the determined operating mode.

The invention is based inter alia on the following concept: the opening duration required for the Miller operation is to be set at any arbitrary point in time in conjunction with a variable valve gear. Under full-load demand, a conventional (non-Miller) operation (four-cycle operation) having an, at least almost, maximum opening duration is first set, in particular in that the second operating position of the lift adjustment of the valve gear is set.

By virtue of the thermal inertia of the components, the maximum permissible exhaust gas temperature is reached only with a temporal delay once full load has commenced, and the low manifold pressure requirement of the conventional valve timings has a positive effect on the driving ability and the power yield. The internal combustion engine is switched over to the Miller operation only once the maximum exhaust gas temperature has been reached, in particular in that the first operating position of the lift adjustment of the valve gear is set.

The exhaust gas temperature and/or other relevant operating temperatures here can be determined by a physical model and/or by a sensor, for example.

Valve gears used in products of the applicant enable the shortening of the opening duration required for implementing the Miller operation under conditions close to full load; this however can result in a serious decrease in terms of the valve lift and thus of the control cross section. In contrast, a valve gear conceived in a targeted manner for the Miller operation leads to an improved Miller lift profile. A larger control cross section is achieved in comparison to before at a comparable opening duration. One challenge now lies in enabling a fully variable valve gear conceived for the Miller operation to handle also larger control cross sections. The full-lift profile is furthermore intended to enable a non-Miller operation in association with a minor increase of the manifold pressure requirement in comparison to the current valve gear.

The invention is based now inter alia on the idea to overall achieve an optimal compromise between a non-Miller and a Miller operation that maximizes the advantages of the combined operating strategy. In order to ideally also achieve an optimal valve lift curve for the conventional operation, the valve gear is in particular conceived such that, for example, free running and/or other functional aspects enable a higher lift than the maximum lift that can be implemented by the Miller opening duration.

The Miller valve lift is not conceived as the maximum valve lift of the system but as a partial lift. When the nominal valve lift is now increased beyond the Miller lift, the opening duration and the control cross section increase until the functionally maximum lift is achieved.

It is inter alia decisive in the pursued adjustment of the lift that no increase in terms of the acceleration of valve that exceeds the permissible limits in terms of profile and maximum arises up to the absolute valve lift maximum. Accordingly, the fully variable valve gear is in particular conceived such that the accelerations in the Miller valve lift range and from there up to the absolute valve lift maximum are almost constantly maximal. It is ensured in this way that a conventional valve lift as well as a Miller valve lift can release the maximum possible control cross section and at the same time is mechanically robust.

In order for the valve gear to be adapted correspondingly, the person skilled in the art can use tools which are known per se for optimizing the topology of drive components. In order to achieve a mutually corresponding maximum acceleration, the cam contour, the contour of the intermediate lever in the contact region with the cam and on the operating curve, as well as the contact region between the roller cam follower and the operating curve have to be adapted to one another. In the industrial practice of the applicant, it is expedient for the cam contour to be adapted, for example, so that the existing valve gear module in the more concise sense can be continued to be used without modification.

A valve gear adapted in such a manner has even further advantages as a result of the possibility of adjusting lifts and opening durations that exceed the defined Miller valve lift profile.

The optimal Miller nominal opening duration can thus vary when the engine is operated with different boundary conditions (temperature, altitude, etc.). The optimal opening duration can now always be adjusted so as to correspond to these boundary conditions and to the resultant operating strategy, hereby always releasing the best possible control cross section.

If the valve gear is to be installed as an identical part in different engines with a different periphery and/or a general operating strategy, this is thus possible without performing any modifications in terms of the kinematics. The optimal opening duration which differs depending on the engine can be adjusted without any hardware modifications and always releases the best possible control cross section.

In terms of optimizing with a view to the oscillating properties of the system, a compromise has to be found between the maximum lift (under conventional full load) and the Miller partial lift (under Miller full load) of the charge-cycle valve. According to one embodiment, by deviating from a constant intermediate lever speed in the switchover compensation region to slightly increasing the speed at maximum lift (conventional full load) or slightly decreasing the speed at a Miller partial lift (Miller full load), respectively, the respective operating points can be assigned more or less priority (in terms of the opening duration and/or the control cross section). How the compromise between the Miller partial lift and the maximum lift in a specific application can be found, may be a matter of professional tuning by balancing the customer benefit and the requirements in terms of charge change or combustion, respectively.

Depending on the result of this optimization, the result according to different embodiments is that the gradient of the variation of the valve lift guide variable in the switchover compensation region varies, or that the gradient in the switchover compensation region is constant, in particular at least substantially constant.

According to one embodiment, the average gradient of the variation of the valve lift guide variable in the switchover compensation region can be zero, in particular at least substantially zero, such that the maximum valve accelerations in the conventional operation, on the one hand, and in the Miller operation, on the other hand, are identical, in particular at least substantially identical.

In order to enable a slightly higher maximum acceleration of the movement of the charge-cycle valve in the conventional operation by way of the switchover compensation region between the deflection region and the diversion region, according to one embodiment the average gradient of the variation of the valve lift guide variable between the deflection region and the diversion region is negative. According to this embodiment, in the switchover compensation region between the diversion region and the inflection region, the average gradient of the variation of the valve lift guide variable in the switchover compensation region between the diversion region and the inflection region is positive for the same reason. According to one embodiment, the average gradient in the deflection switchover compensation region is negative or positive, and/or the average gradient in the inflection switchover compensation region is positive or negative.

According to one embodiment, the lift regulator in a valve gear having a camshaft is a cam of a camshaft and/or the valve lift guide variable is a development of the radius along a circumferential surface of the cam, in particular in relation to a circumferential direction of the cam, proceeding from a rotation axis of the cam on the camshaft.

The circumferential surface of the cam is in particular the cam contour and, in particular in a rotation of the cam about a rotation axis of the camshaft, is specified for deflecting an intermediate lever of the valve gear, wherein a speed, in particular a rotating speed of the intermediate lever about the rotation axis thereof, is in particular a function solely or primarily of a variation of the radius of the circumferential surface of the cam over the circumferential angles of the circumferential surface.

In particular in the case of a constant maximum curvature, the operating curve of the lift adjustment according to one embodiment in one region has a maximum curvature, wherein the cam contour of the lift regulator is specified for displacing the operating curve in the first operating position and in the second operating position at a constant speed as long as the contact surface of the lifting lever bears on the region of the maximum curvature of the operating curve.

In order to achieve the at least substantially identical maximum acceleration of the charge-cycle valve, the region of the maximum curvature according to one embodiment is disposed on a periphery of the lifting region, the periphery of the lifting region in particular being that periphery that is passed on the operating curve by a contact element of the lifting lever at the beginning of the lifting procedure.

In order to achieve the at least substantially identical maximum acceleration of the charge-cycle valve, the lifting region according to one embodiment has one region of at least reduced curvature, in particular zero curvature, which is in particular disposed so as to be directly adjacent to the region of maximum curvature.

A contacting position of the lifting lever with the operating curve when reaching the maximum lift and/or a contacting position of the lifting lever with the operating curve when reaching the Miller lift is in particular disposed on the region of reduced curvature.

In order for the valve lift to be able to be actuated as early as possible in the Miller operation, the valve gear according to one embodiment is specified for adapting an adjustment time of the lift regulator, in particular by means of a variable camshaft control.

According to one embodiment, the valve gear has a sensor-based and/or a model-based temperature detection installation for detecting an exhaust gas temperature and/or at least one other temperature parameter of the internal combustion engine.

According to one embodiment, the temperature detection installation is specified for detecting the exhaust gas temperature and/or the at least one other temperature parameter at an engine-distal end of an exhaust manifold and/or at a turbine inlet of a turbine, in particular having a variable turbine geometry. The temperature detection can thus be used for protecting components of the exhaust gas path.

According to one embodiment, the valve gear has a control unit for operating the valve gear which is specified in particular for adjusting different operating positions of the operating curve. The control unit can be, for example, part of a superordinate motor control unit, a drive control unit or a vehicle control unit.

According to one embodiment, an earlier adjustment point in time of the lift regulator is set when switching the Miller operating mode, in particular by means of a variable camshaft control.

Further advantages and potential applications of the invention are derived from the description hereunder in conjunction with the figures.

DETAILED DESCRIPTION OF THE DRAWINGS

Figure 1:
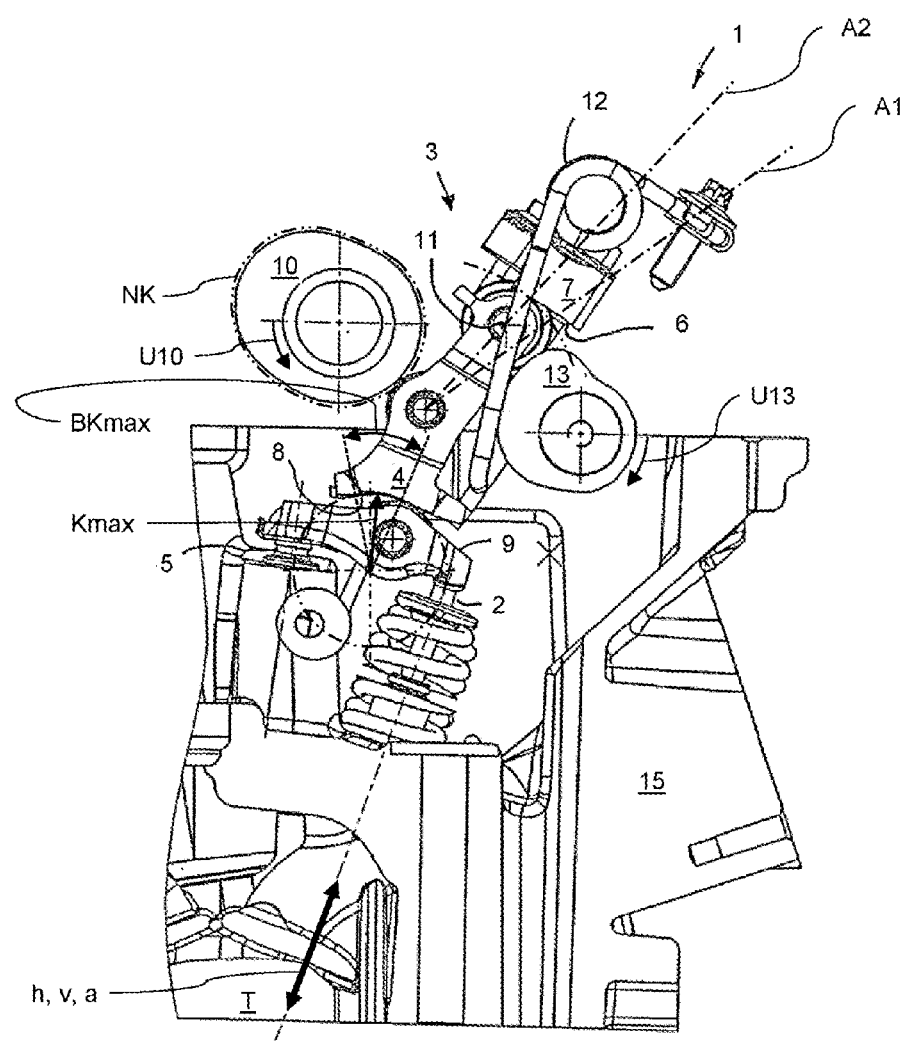
FIG. 1 shows a section through a variable lift valve gear according to an exemplary embodiment of the invention.

FIG. 1 shows a section through a variable lift valve gear 1 in the installed position in a cylinder head 15 for an internal combustion engine (not illustrated), when viewed toward a first charge-cycle valve activation unit 3. The charge-cycle valve activation unit 3 is provided for activating charge-cycle valves 2 of identical action. In the present exemplary embodiment the internal combustion engine has four cylinders in line, having in each case two charge-cycle valves 2 of identical action.

The variable lift valve gear 1 disposed in the cylinder head 15 has a lift adjustment 4, an intermediate lever which on one side by way of a roller (not provided with a reference sign) is mounted so as to be movable by rolling on a guide gate track 6 of a guide gate 7, and on the other side has an operating curve 8.

Figure 3:
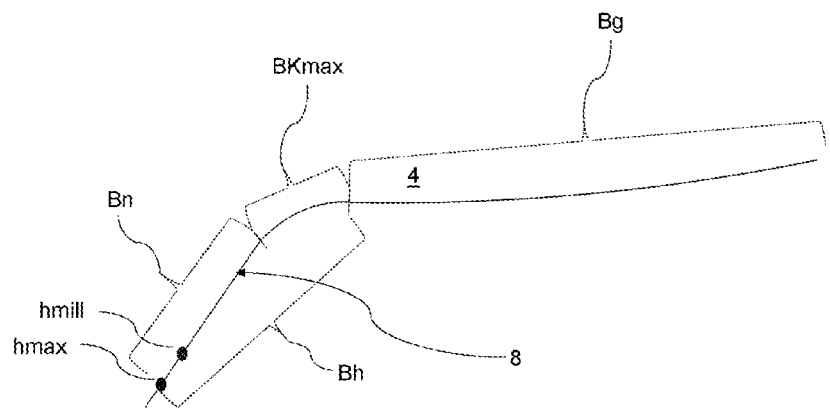
FIG. 3 shows the operating curve of the valve gear according to FIG. 1.

As can be derived from FIG. 3, the operating curve is divided into a basic circle region Bg and a lifting region Bh, wherein the operating curve 8, at least in part of the lifting region Bh, has a region BKmax having a consistent maximum curvature Kmax. In a further region Bn adjacent thereto, the lifting region Bh has no curvature or at least a reduced curvature.

The operating curve 8 by way of a lifting lever 9, a roller cam follower, is operatively connected to a charge-cycle valve 2 in such a manner that the charge-cycle valve 2 along the plotted axis can be deflected by a specific lift h at a speed v and an acceleration a.

The roller cam follower 9 on the one side is supported on a shank of the charge-cycle valve 2 and on the other side on a clearance compensation element 5, a hydraulic clearance compensation element.

Furthermore provided is a lift regulator 10 (also referred to as the first adjustment device 10), a cam of a camshaft, having a cam contour NK (=cam contour) for pivoting the intermediate lever 4, counter to a spring force of a spring element 12, about a guide gate proximal point 11, a center of rotation of the roller supported on the guide gate track 6. The cam contour NK is defined by a profile of a radius about the point of rotation of the cam 10 along the plotted circumferential direction U10.

The intermediate lever 4 by a second adjustment device 13, an eccentric disk on an eccentric shaft, is displaceable along the guide gate track 6 by way of the roller that supports the intermediate lever 4 on the guide gate track 6. In a manner corresponding to an eccentric contour of the second adjustment device 13, the intermediate lever 4 can be displaced between a zero operating position (not plotted here), a first operating position A1 for a Miller operation, as well as a second operating position A2 for a normal operation. The eccentric contour is defined by a radius profile about the point of rotation of the eccentric along the plotted circumferential direction U13.

In terms of the functional mode of the variable lift valve gear 1 per se, reference is also made to the international patent application WO 2002/092972 A1.

The second adjustment device 13 thus has a zero setting point for a zero lift, a second setting point for partial lift, and a third setting point for a full lift of the charge-cycle valve 2. Each setting point is represented by a point on the curve of a circular segment of the eccentric disk, i.e. the intermediate lever 4 in terms of the position thereof along the guide gate track 6 is displaced in the rotation of the second adjustment device 13, as a result of which a charge-cycle valve lift that takes place by a rotation of the lift regulator 10 is variable.

Zero lift means that the charge-cycle valve 2 is stationary, this corresponding to a cylinder shut-off. Partial lift means that the charge-cycle valve 2 has a charge-cycle valve lift that is smaller than a full lift, such as for example in the case of a Miller operation. Full lift means the maximum possible valve lift.

In further exemplary embodiments, the second adjustment device 13, instead of a cam disk, can also be replaced by linear actuating installations which have different detents or latching installations, respectively, that correspond to the zero lift, the partial lift and the full lift of the charge-cycle valve 2. The activation here can take place electrically and/or mechanically or hydraulically. The activation in the present exemplary embodiment takes place by an electric motor.

In order to enable at least substantially identical maximum valve acceleration in the first operating position A1 and the second operating position A2, the contours of the lift regulator (cam contour NK), of the lift adjustment 4 (including the operating curve 8), and of the lifting lever 9 have been adapted to one another when designing the valve gear 1.

In the exemplary embodiment, a customary software tool for optimizing the topology of drive components has been used for adapting the valve gear in a corresponding manner. In order to achieve a mutually corresponding maximum acceleration $a_{max,A}/a_{max,E}$ or $a_{max,mill,A}/a_{max,mill,E}$ in the first operating position A1 and in the second operating position A2, the cam contour NK, the contour of the intermediate lever in the contact region with the cam 10 and on the operating curve 8, as well as the contact region of the roller cam follower 9 with the operating curve 8 have been adapted to one another.

In the exemplary embodiment here, only the cam contour NK has been suitably adapted so that the existing valve gear module, the charge-cycle valve activation unit 3, can continue to be used without modification.

How the cam contour NK, thus the radius profile of the cam 10 along the circumferential direction U10, has to be adapted in the individual specific application so as to achieve the mutually corresponding maximum accelerations $a_{max,A}$ in the individual case, is a matter for the person skilled in the art while using in a manner known per se a software tool known per se for optimizing the topology and taking into account the requirements resulting from the operating strategy of the motor known in the individual case.

Figure 2:
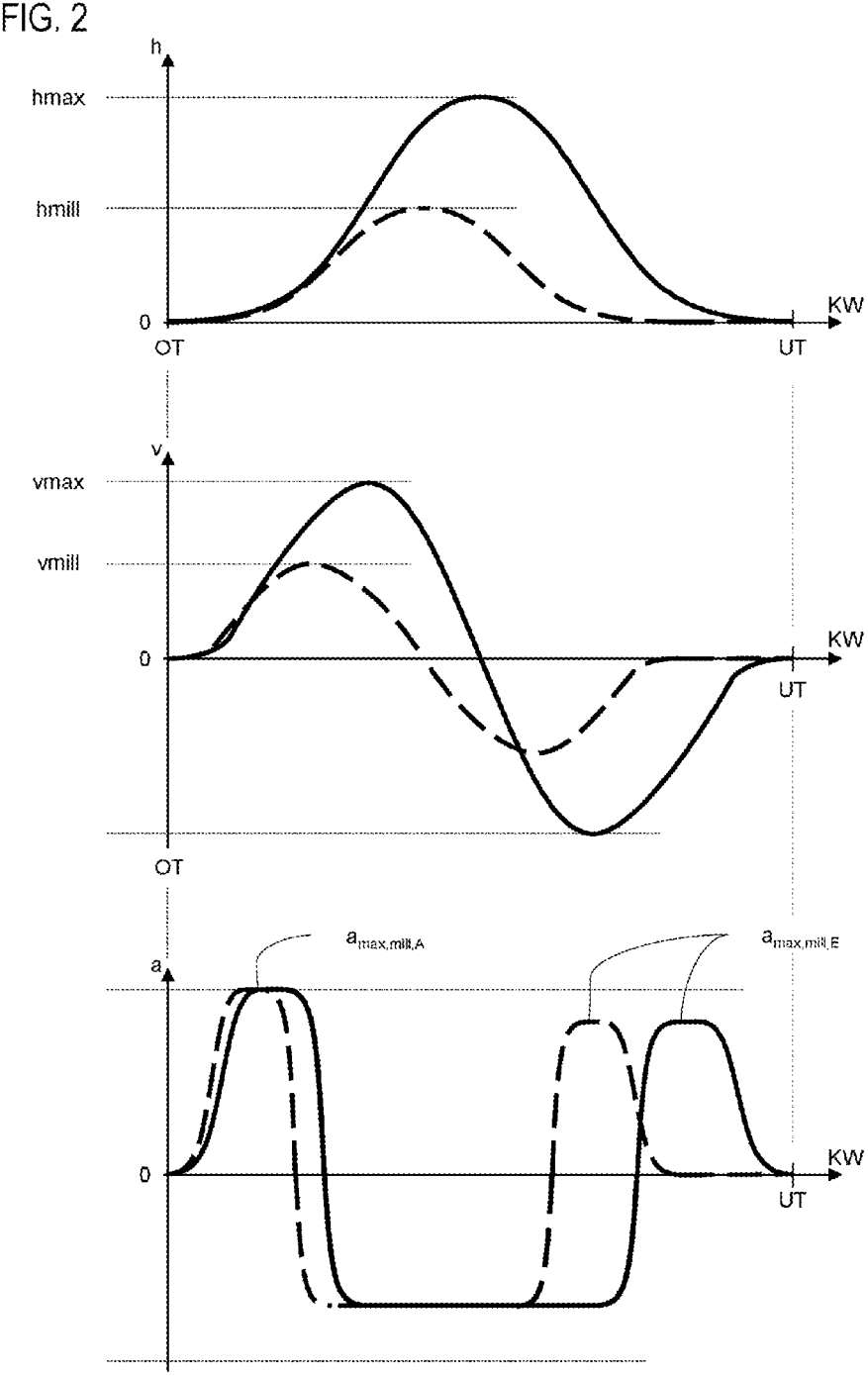
FIG. 2 shows diagrams in which for a rotation of the camshaft of the variable lift valve gear according to FIG. 1 the lift of the charge-cycle valve, or the speed of the valve deflection or the acceleration in the valve deflection, respectively, is in each case plotted in relation to a crank angle of the crankshaft when the valve gear according to FIG. 1 is operated by a method according to an exemplary embodiment of the invention.

An embodiment of a method according to an exemplary embodiment of the invention is explained hereunder by means of FIG. 2.

FIG. 2 shows three diagrams: in the upper diagram the lift h is plotted over the crank angle KW; in the central diagram the lift speed v is plotted over the crank angle KW; and in the lower diagram the lift acceleration a is plotted over the crank angle KW.

The corresponding development of the variable h, v, a over the crank angle in each of the three diagrams is plotted for a maximum lift hmax (solid line), on the one hand, and for a Miller lift (partial lift; dashed line), on the other hand.

In the case of a requirement of full load, a conventional (non-Miller) operation having an at least almost maximum opening duration is first set, in particular in that the second operating position of the lift adjustment of the valve gear is set. This operating case is illustrated by solid lines in the diagrams.

The internal combustion engine is switched over to the Miller operation only once a maximum exhaust gas temperature T has been reached (see the exemplary entry in FIG. 1 in the combustion chamber; this being determined based on a model in the exemplary embodiment), in particular in that the first operating position of the lift adjustment of the valve gear is set. This operating case is illustrated by dashed lines in the diagrams.

The reduced lift height hmill in the Miller operation—in comparison to the maximum lift hmax—can be derived on the one hand from the upper diagram (lift diagram). On the other hand, a variable camshaft control not illustrated in FIG. 1 ensures that, in terms of the crank angle in the Miller operation, the greatest lift hmill takes place earlier than the greatest lift hmax in the normal operation.

It can be derived from the central diagram (speed diagram) that a lower maximum speed vmill of the valve 2 during adjustment is sufficient for the Miller operation—in comparison to the maximum speed vmax in the normal operation.

The adjustment of the cam contour NK according to this exemplary embodiment of the invention can be derived from the lower diagram (acceleration diagram): the highest accelerations $a_{max,A}$ and $a_{max,mill,A}$ or $a_{max,E}$ and $a_{max,mill,E}$, respectively, are identical in the normal operation and in the Miller operation. In those crank angle ranges in which the highest accelerations a during deflection or during inflection, respectively, are displayed in the acceleration diagram, the operating curve 8 in the region of the maximum curvature BKmax thereof rolls on the roller cam follower 9.

As can be derived from FIG. 3, a roller of the roller cam follower 9, depending on the operating mode, contacts the operating curve at the point hmill or at the point hmax, thus in each case in the region Bn.

Figure 4:
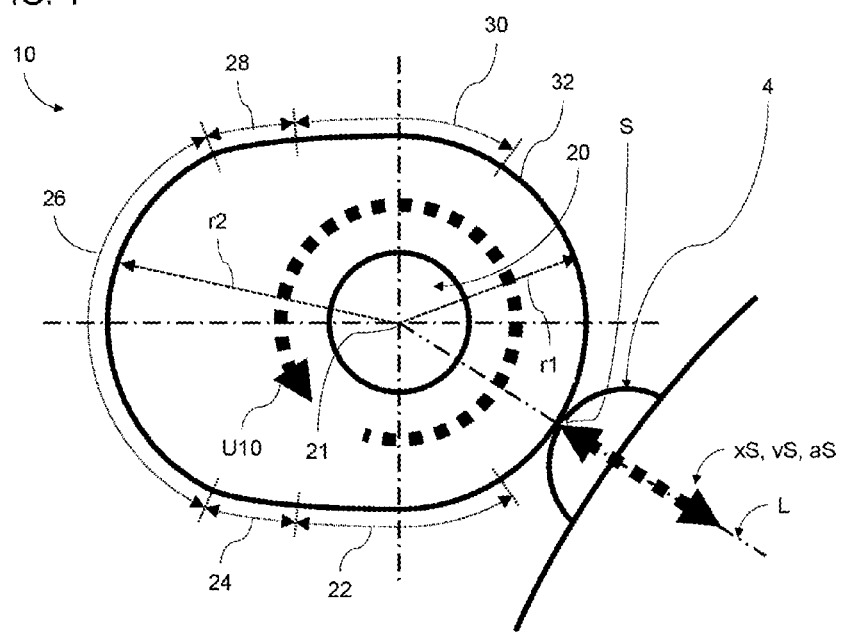
FIG. 4 shows a cross section through a lift regulator of a variable lift valve gear according to a further exemplary embodiment of the invention.

FIG. 4 shows a cross section through a lift regulator 10 of a variable lift valve gear 1 according to a further exemplary embodiment of the invention. The valve gear, and thus also the lift regulator 10, can be configured as in the exemplary embodiment according to FIG. 1, or else in another manner.

It can be derived from the illustration of FIG. 4 that the lift regulator 10 is configured as a cam of a camshaft 20 and is connected in a rotationally fixed manner to the camshaft 20. The cam 10 on the circumferential side thereof has a cam contour NK which at an angular position W, which (with the optional exception of the deflection movement) is fixed, a contact point S for deflecting the lift adjustment 4 bears on the latter.

The cam contour NK along the circumferential direction U10 of the cam 10 has different circumferential regions: a deflection region 22 for deflecting the lift adjustment 4 from the resting position thereof, a deflection switchover compensation region 24 for adapting the maximum deflection valve accelerations $a_{max,A}$ in the conventional operation and $a_{max,mill,A}$ in the Miller operation of the valve gear, a diversion region 26 for adjusting the maximum valve lift, an inflection switchover compensation region 28 for adapting the maximum inflection valve accelerations $a_{max,E}$ in the conventional operation and $a_{max,mill,E}$ in the Miller operation of the valve gear, as well as an inflection region 30 for inflecting the lift adjustment 4 to the resting position thereof. The different regions 22, 24, 26, 28 and 30 are only schematically plotted in the illustration, just as the plotted cam contour NK is to be understood to be merely schematic. A person skilled in the art will optimize a real cam contour NK by suitable software, while taking into account the specific parameters of the invention as well as other parameters, for example resulting from the kinematics of the valve gear.

When the camshaft 20 rotates about the rotation axis 21 thereof at an angular speed co, the distance (thus the radius) between the rotation axis 21 and the contact point S varies at the angular position W so as to correspond to the respective radius of the cam 10 at a specific circumferential position. The dissimilar radii r1 and r2 are plotted in an exemplary manner to aid understanding in FIG. 4.

In the plotted direction of rotation U10, the deflection region 22 by way of an increasing radius first passes the contact point S and herein deflects the lift adjustment 4 at an increasing speed vS and at a maximum of the acceleration of the contact point aS.

The deflection switchover compensation region 24 is subsequently passed, in which the radius further increases but, in the context of the invention, the contact point S along an axis of movement L of the contact point S is deflected at a constant speed (cf. solid line in the diagram of FIG. 5) or at a slightly decreasing speed (cf. dashed line in the diagram of FIG. 5).

When passing the deflection region 26, the radius first increases at an ever slower rate and subsequently decreases ever faster once the maximum of the deflection of the contact point S (and thus of the charge-cycle valve 2) has been passed.

Subsequently, the inflection switchover compensation region 28 is passed, in which the radius further decreases but, in the context of the invention, the contact point S along the axis of movement L of the contact point S is inflected at a constant or slightly increasing speed.

The minimum radius r1 by way of which the charge-cycle valve 2 is disposed in the resting position thereof is subsequently reached again in the inflection region 30.

Figure 5:
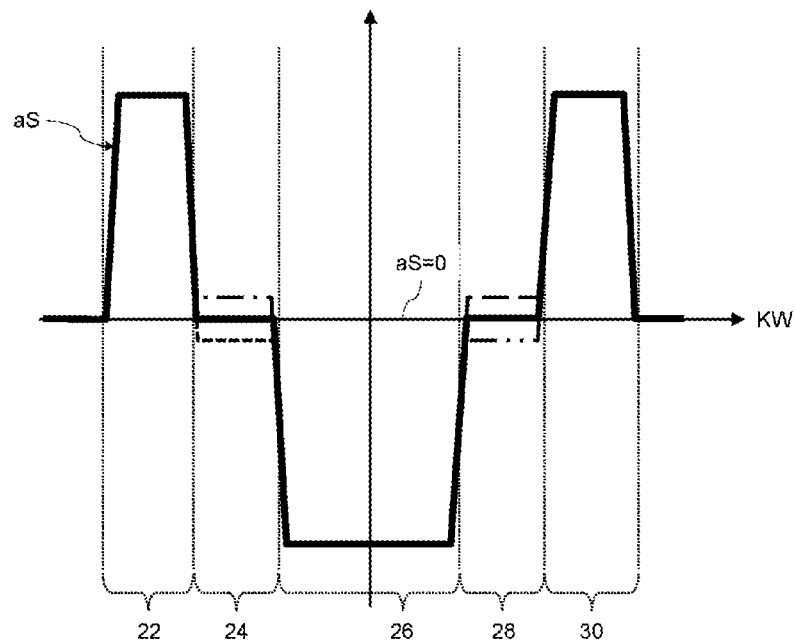
FIG. 5 schematically shows a profile of a gradient of a variation of a valve lift guide variable across the circumference of a cam contour of the lift regulator according to FIG. 4 when rotating about the rotation axis of the lift regulator.

FIG. 5 schematically shows a profile of a gradient of a variation of a valve lift guide variable over the crank angle KW of the camshaft 20 (thus also across the circumference U) of a cam contour NK of the lift regulator 10 according to FIG. 4 in a rotation about the rotation axis 21 of the lift regulator. The gradient in the exemplary embodiment corresponds to the acceleration aS of the contact point S in a manner corresponding to the deflection by the cam contour NK.

The contact point S is not displaced in a resting region 32 of the cam contour NK; accordingly, the acceleration aS is equal to zero. The acceleration reaches a positive maximum in the deflection region 22 before it in the deflection switchover compensation region 24 is either equal to zero (solid line) or slightly negative (dashed line with short dashes) or slightly positive (chain-dotted line). The acceleration reaches a negative maximum in the diversion region 26. An absolute value of the acceleration aS in the deflection switchover compensation region 24 is thus smaller than in the two adjacent regions 22 and 26. The same applies in an analogous manner to the inflection switchover compensation region 28 and the two adjacent regions 26 and 30, wherein here, as an alternative to a value of zero for the acceleration aS (solid line) in the inflection switchover compensation region 28, a slightly positive acceleration value (dashed line with long dashes) or a slightly negative acceleration value (double chain dotted line) may be provided.

Figure 6:
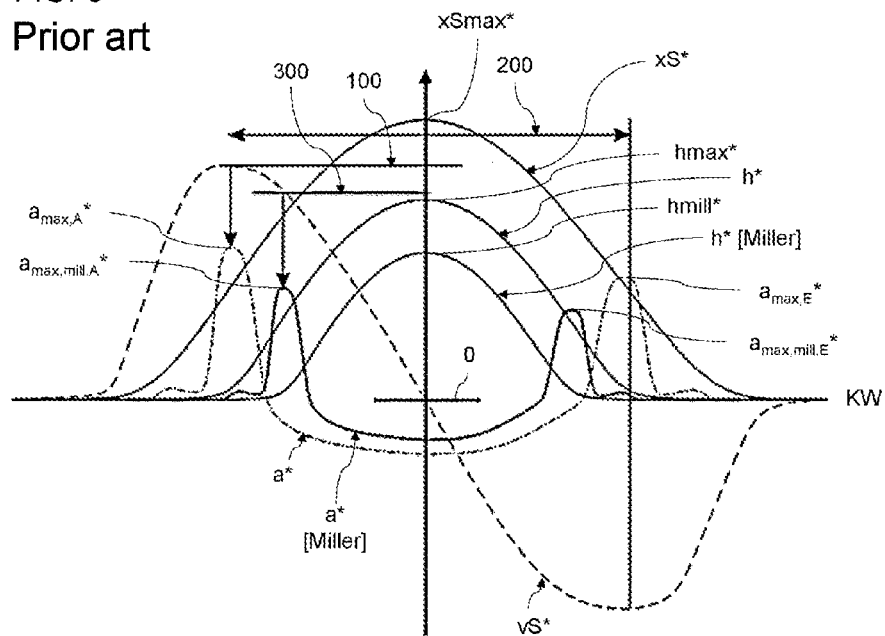
FIG. 6 for a known valve gear having a cam on a camshaft and an intermediate lever as the lift adjustment shows a profile of the intermediate lever movement and of the valve lifts in the conventional operation and in the Miller operation.

FIG. 6 for a known valve gear having a cam on a camshaft and an intermediate lever as a lift adjustment shows a profile of the movement of the intermediate lever and of the valve lifts in the conventional operation and in the Miller operation.

An optimal valve elevation, thus one having a maximum control cross section, can in particular be implemented for fully variable valve lifts, e.g. those in which an intermediate lever by way of a specific movement with an operating curve fastened thereon push onto a roller cam follower, always only for a specific valve lift (usually the maximum lift). Each other lift (usually the partial lifts) is a consequence of this being conceived with a view to the maximum lift and is not optimal in this instance.

However, modern valve lift curves significantly differ from the theoretical curves which in turn have very homogenous profiles, in particular because the profiles are adapted to the oscillating behavior of the overall system. This oscillating behavior differs in the various partial lifts. For example, an optimization of the order which is incorporated for the maximum lift acts with less intensity in the partial lift or even acts with the opposite effect and can be compensated for only by a disproportionate reduction in terms of the maximum acceleration.

A real valve lift curve having a normal operation and a Miller operation—for a known valve gear—is illustrated in FIG. 6 and explained in the following.

The opening region of the operating curve has to be passed at maximum speed in order to attain the maximum acceleration required for achieving the optimal valve lift curve. The movement of the intermediate lever—this being at least substantially proportional to the displacement path of the contact point xS* of which the profile is plotted here—therefore has to be at its maximum speed vS* at this point/region (cf. reference sign 100 in FIG. 6).

The length of the opening region is established by the geometry of the operating curve and may fundamentally not differ in terms of partial lifts of the maximum lift.

The maximum return acceleration of the intermediate lever as well as the maximum inflection valve acceleration $a_{max,E}$* of the charge-cycle valve 2 is limited by restoring spring forces. In order to decelerate the ideally high speed of the intermediate lever when passing the opening region, the region of the speed deceleration must start immediately upon passing the opening region. Once the opening region of the operating curve in the rated lift has been passed, the intermediate lever speed vS* accordingly drops (cf. reference sign 200 in FIG. 6).

As a consequence of the fundamental construction of the fully variable lift regulator, the opening region of the operating curve in the partial lift, thus in the Miller operation, is passed by a region of the intermediate lever movement xS* which presents itself later in comparison to the region at maximum lift (cf. reference sign 300 in FIG. 6). The speed vS* here, as described above, is lower than at the maximum lift, and the maximum valve acceleration $a_{max,mill,A}$* is therefore lower and the control cross section is no longer at its maximum/optimum. The same applies in an analogous manner to the closing of the valve.

In the known valve gears it thus has to be decided already in the stage of the basic design for which valve lift the latter is optimally conceived. This optimum in the known valve gears has been designed by the person skilled in the art so as to be at the maximum lift because the latter influences the system output.

Figure 7:
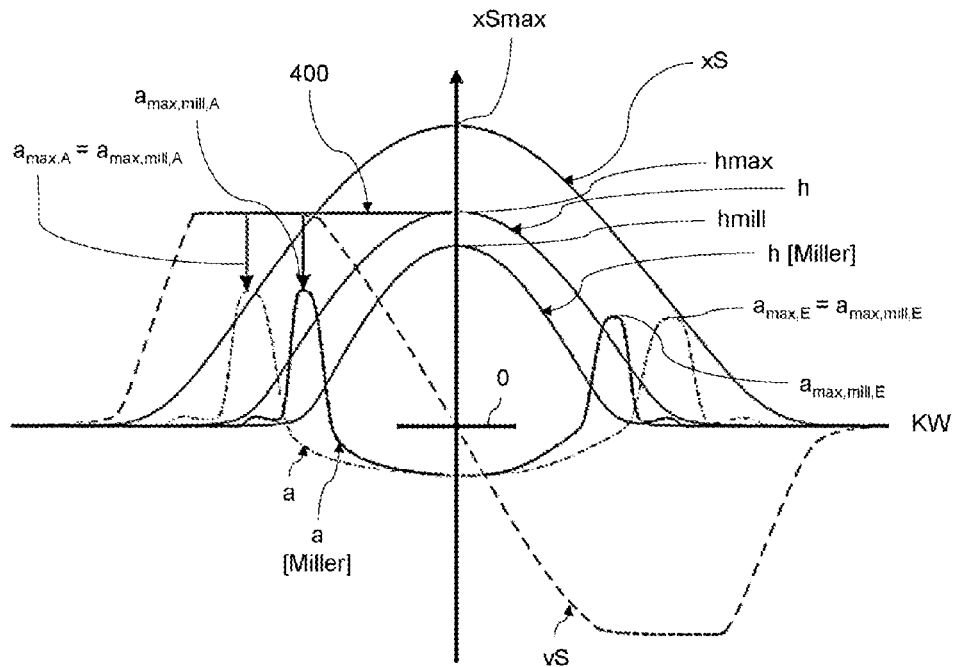
FIG. 7 for the valve gear from FIG. 4 shows a profile of the intermediate lever movement and of the valve lifts in the conventional operation and in the Miller operation.

FIG. 7 for the valve gear from FIG. 4 shows a profile of the intermediate lever movement xS and of the valve lifts hmax and hmill in the conventional operation and in the Miller operation, from which it becomes apparent that the invention here makes a decisive difference which is explained hereunder.

A maximum valve acceleration $a_{max,A}$ in the conventional operation of the valve gear 1, or an ideally high speed vS of the intermediate lever movement caused by a long braking phase of the intermediate lever at the maximum lift is very intentionally dispensed with, in favor of only a maximum valve acceleration $a_{max,mill,A}$ being adjusted also in the conventional operation.

The remaining maximum acceleration $a_{max,mill,A}$ is also generated in the partial lift, the Miller lift. Because the opening duration here is shorter, the intermediate lever speed vS must be lower. The maximum intermediate lever acceleration aS at a lower speed vS is generated by a greater curvature BKmax on the operating curve 8. The intermediate lever speed vS in the exemplary embodiment must never be significantly higher than in the Miller partial lift, not even at the maximum lift. In this way, there is an entirely intentional loss in terms of control cross section.

The intermediate lever movement S has a region of constant speed vS in the deflection switchover compensation region 24 and in the inflection switchover compensation region 28 (cf. reference sign 400 in FIG. 6). This results in that the valve gear 1 in the first operating position A1 and in the second operating position A2 the charge-cycle valve 2 adjusts at an at least substantially identical maximum valve acceleration $a_{max,mill,A}$ when deflecting or $a_{max,mill,E}$ when inflecting, respectively.

The difference between known valve gears and the valve gear 1 according to the invention is visually derived in particular from FIGS. 6 and 7. The known valve gears, as shown in FIG. 6, specifically do not have a mutually corresponding or very similar maximum valve acceleration $a_{max,A}$ or $a_{max,mill,A}$ in the normal operation and in the Miller operation. Rather, a maximum valve acceleration $a_{max,A}*$ is adjusted in the conventional operation, and a lower maximum valve acceleration $a_{max,mill,A}*$ is adjusted in the Miller operation. The same applies in an analogous manner to the inflection of the valve.

A minor drop in terms of the intermediate lever speed vS in the deflection switchover compensation region 24 may optionally be expedient in the context of an overall optimization of the system in individual specific applications, but this is not mandatory.

In terms of optimizing to the oscillation properties of the system, a compromise between a maximum valve lift at conventional full load and a Miller partial lift at Miller full load may be found. To this end, the respective operating lift can be assigned more or less priority in terms of opening duration and/or control cross section, for example, by way of a predetermined deviation from a constant intermediate lever speed vS right through to a slight increase of the speed vS at a conventional lift, or by way of a slight reduction of the speed vS at a Miller partial lift. This, by way of a variation of the illustrated exemplary embodiment, results in slight acceleration values aS in the deflection switchover compensation region 24, or the inflection switchover compensation region 28 that deviate from zero (cf. dashed lines in the diagram in FIG. 5).

The exact compromise between the Miller partial lift and the maximum lift is to be balanced in particular while taking into account parameters in the context of an optimum in terms of load change, or combustion, respectively.

Figure 8:
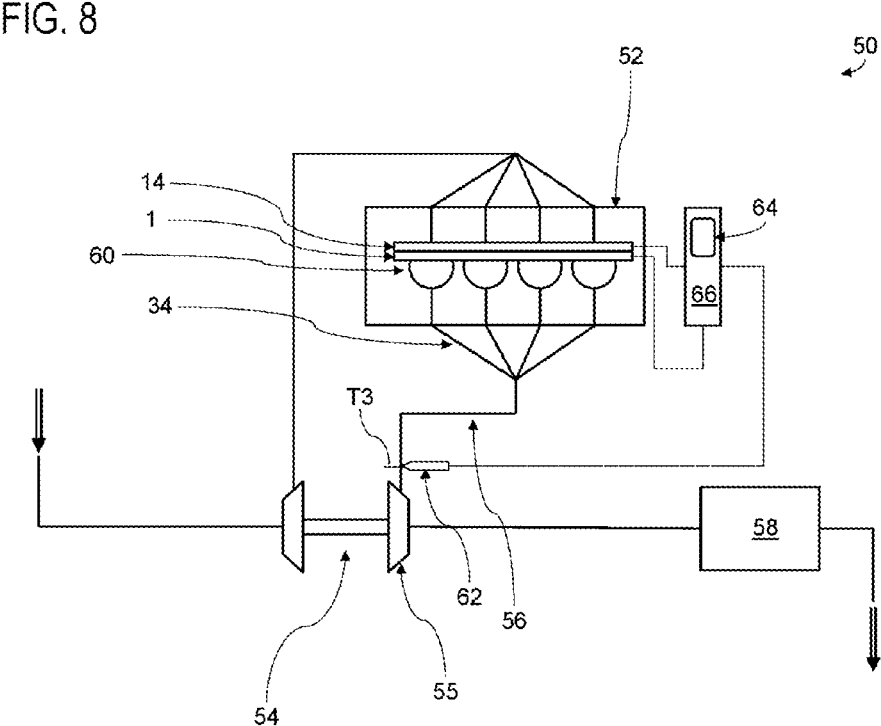
FIG. 8 schematically shows a topology of an internal combustion engine having a variable lift valve gear according to FIG. 4.

FIG. 8 schematically shows a topology of a vehicle drive 50 having an internal combustion engine 52 having a variable lift valve gear 1 which can be configured in particular according to FIG. 1 and/or according to FIG. 4. A method according to an exemplary embodiment of the invention for operating a variable lift valve gear will be explained hereunder by means of the illustration, the variable lift valve gear being potentially configured according to the exemplary embodiment as per FIG. 1 and/or according to the exemplary embodiment as per FIG. 4, for example.

The vehicle drive 50 additionally has a turbocharger 54, an exhaust gas path 56 and an exhaust gas post-treatment device 58. The illustration of the various fluid paths is highly simplified and is not intended to explain all of the details of the vehicle drive 1 but only the concept of the invention and of specific exemplary embodiments. For example, neither an exhaust gas recirculation nor a divert-air valve or a wastegate is illustrated despite these components as well as other components being installed in many turbocharged engines.

The internal combustion engine 52 in the exemplary embodiment has four cylinders 60 (but may have more or fewer cylinders) which by means of the charge air supply 6 and an injection unit 14 are supplied with a mixture of air and fuel, wherein the valve gear 1 by way of the charge-cycle valves 2 determines the supply of the charge air into the cylinders 60 and the discharge of the exhaust gases from the cylinders.

In the illustration of FIG. 8, a temperature sensor 62 is directly ahead of a turbine 64 of the turbocharger 54 in the exhaust gas flow (for example at the downstream end of the exhaust manifold). The temperature sensor 62 is specified for detecting an indicator of an exhaust gas temperature, in particular in real-time, at a predetermined location T3, the temperature sensor 62 being disposed at the latter.

In terms of the illustrated embodiment of the invention it is however likewise possible that the detection of the temperature does not take place by means of the temperature sensor 62, or not exclusively by the latter, but in particular exclusively by means of a corresponding temperature model 64 for the location T3, or at least by means of a comparison between the indicators detected by the sensor 62 and the temperature model 64.

Such a temperature model 64, preferably as a function of operational characteristics of the drive 50, has available with sufficient accuracy and reliability a respective temperature to be expected at the observed location T3 of the exhaust gas path 56 for a multiplicity of combinations of the operational characteristics.

The exhaust gas path moreover has a control means 66 which for transmitting control commands and/or status data and/or sensor data is connected to the temperature sensor 62, to the injection unit 14, to the valve gear 1 as well as to the temperature model 55. The control means 66 can also be configured so as to be integrated with a control means of the internal combustion engine 52, of the drive 50 or of the entire motor vehicle.

In order for the method to be carried out, the two steps are performed: (i) determining an exhaust gas temperature T in an operating situation of the internal combustion engine 52; (ii) determining whether the valve gear 1 in the operating situation is to be switched to a conventional operating mode or to a Miller operating mode, wherein the operating mode to be switched is determined as a function of the determined exhaust gas temperature T.

The exhaust gas temperature T here is determined at the location T3, in particular at an engine-distal end of an exhaust manifold of the exhaust gas path 56 and/or at a turbine inlet of a turbine 55, having a variable turbine geometry, of the exhaust gas turbocharger 54 of the internal combustion engine 52. When a limit value Tg of the exhaust gas temperature T is reached or exceeded, the valve gear 1 is switched to the Miller operating mode.

The limit value Tg of the exhaust gas temperature T is determined as a function of a heat resistance of a turbine material of the exhaust gas turbocharger 54.

LIST OF REFERENCE SIGNS

1 Valve gear
2 Charge-cycle valve
3 Charge-cycle valve activation unit
4 Lift adjustment (in particular intermediate lever)
5 Clearance compensation element
6 Guide gate track
7 Guide gate
8 Operating curve
9 Lifting lever (in particular roller cam follower)
10 Lift regulator/first adjustment device (in particular cam of a camshaft)
11 Guide gate proximal point
12 Spring element
13 Second adjustment device (in particular eccentric disk)
15 Cylinder head
20 Camshaft
21 Rotation axis
22 Deflection region
24 Deflection switchover compensation region
26 Diversion region
28 Inflection switchover compensation region
30 Inflection region
32 Resting region
50 Vehicle drive
52 Internal combustion engine
54 Turbocharger
55 Turbine
56 Exhaust gas path
58 Exhaust gas post-treatment device
60 Cylinder
62 Temperature sensor
64 Temperature model
66 Control means
100 Reference sign in FIG. 6
200 Reference sign in FIG. 6
300 Reference sign in FIG. 6
400 Reference sign in FIG. 7
A1 First operating position of the lift adjustment
A2 Second operating position of the lift adjustment
a Acceleration of the charge-cycle valve
$a_{max,A}$ Maximum acceleration of the charge-cycle valve when deflecting in the conventional operation
$a_{max,mill,A}$ Maximum acceleration of the charge-cycle valve when deflecting in the Miller operation
$a_{max,E}$ Maximum acceleration of the charge-cycle valve when inflecting in the conventional operation
$a_{max,mill,E}$ Maximum acceleration of the charge-cycle valve when inflecting in the Miller operation
aS Acceleration of the contact point
Bg Basic circle region of the operating curve
Bh Lifting region of the operating curve
BKmax Region of a maximum curvature of the utilized operating curve
h Lift of the charge-cycle valve
hmax Maximum lift
hmill Miller lift
Kmax Maximum curvature of the operating curve
KW Crank angle of the internal combustion engine
L Movement axis of the contact point
NK Cam contour (in particular cam contour) of the first adjustment device
OT Top dead center
Phmax Contacting position at hmax
Phmill Contacting position at hmill
r Radius
S Contact point between cam contour and lift adjustment
T3 Position of the temperature sensor in the exhaust gas path
Tg Limit value of the exhaust gas temperature
UT Bottom dead center
U10 Circumferential direction of the first adjustment device
U13 Circumferential direction of the second adjustment device
v Speed of the charge-cycle valve
vS Speed of the contact point
W Fixed angular position in the circumference of the rotation axis of the camshaft
xS Displacement path of the contact point between the cam contour and the lift adjustment
ω Angular velocity of the camshaft

The invention claimed is:

1. A lift regulator for a variable lift valve gear, comprising:
a cam contour disposed about a rotation axis of the lift regulator so as to deflect a lift adjustment of the valve gear in a rotation of the lift regulator about the rotation axis,
wherein the cam contour has a deflection region, a diversion region, and an inflection region,
wherein the cam contour further has a deflection switchover compensation region between the deflection region and the diversion region, and/or an inflection switchover compensation region between the deflection region and the inflection region, and
wherein, during a rotation about the rotation axis, an absolute value of a gradient (aS) of a variation of a valve lift guide variable (xS, r) of the lift regulator in the deflection switchover compensation region and/or in the inflection switchover compensation region is smaller than in the deflection region and in the diversion region.

2. The lift regulator according to claim 1, wherein
the lift regulator is configured as a cam of a camshaft,
the valve lift guide variable is a radius of the cam contour of the cam along a circumferential surface of the cam, and
the gradient is an acceleration of an envisaged contact point between the cam contour of the cam and the lift adjustment during a rotation of the cam conjointly with the camshaft about the rotation axis of the camshaft.

3. The lift regulator according to claim 1, wherein
a value of an average gradient in the deflection switchover compensation region or in the inflection switchover compensation region, respectively, is at most two thirds or half of the gradient of the valve lift guide variable of the adjacent deflection or inflection region, respectively, of the cam contour.

4. The lift regulator according to claim 1, wherein
a value of an average gradient in the deflection switchover compensation region or in the inflection switchover compensation region, respectively, is at most one fifth, one eighth or one tenth of the gradient of the valve lift guide variable of the adjacent deflection or inflection region, respectively, of the cam contour.

5. The lift regulator according to claim 1, wherein
the gradient in the deflection switchover compensation region and/or in the inflection switchover compensation region varies.

6. The lift regulator according to claim 1, wherein
the gradient in the deflection switchover compensation region and/or in the inflection switchover compensation region is substantially constant.

7. The lift regulator according to claim 1, wherein
an average gradient in the deflection switchover compensation region and/or in the inflection switchover compensation region is substantially zero.

8. The lift regulator according to claim 1, wherein
an average gradient in the deflection switchover compensation region is negative or positive, and/or
the average gradient in the inflection switchover compensation region is positive or negative.

9. The lift regulator according to claim 8, wherein
a circumferential surface is the cam contour and is specified for deflecting an intermediate lever of the valve gear.

10. A variable lift valve gear for a charge-cycle valve of an internal combustion engine, comprising:
a lift adjustment having an operating curve which is disposable at least in a first operating position (A1) for adjusting a partial lift and in a second operating position (A2) for adjusting a maximum lift, wherein the operating curve has a lift region (Bh) and a basic circle region (Bg);
a lift regulator according to claim 1;
a lifting lever which is deflectable via the operating curve and as a result thereof adjusts a lift of the charge-cycle valve,
wherein
the valve gear is configured for adjusting the charge-cycle valve at a mutual ratio of the maximum valve accelerations ($a_{max,A}$, $a_{max,E}$) in the first operating position (A1) and the maximum valve accelerations ($a_{max,mill,A}$, $a_{max,mill,E}$) in the second operating position (A2), wherein the ratio is a function of the gradient (aS) of the variation (vS) of the valve lift guide variable (xS, r) of the lift regulator in the deflection switchover compensation region and/or in the inflection switchover compensation region.

11. The lift regulator according to claim 10, wherein
the lift adjustment is an intermediate lever and the lift regulator is a cam of a camshaft.

12. The valve gear according to claim 10, wherein
the valve gear is configured for adjusting the charge-cycle valve so as to have an at least substantially identical maximum valve acceleration ($a_{max,mill,A}$, $a_{max,mill,E}$) in the first operating position and in the second operating position.

13. The valve gear according to claim 10, wherein
the cam contour of the lift regulator is configured for displacing the lift adjustment by way of a ratio of a speed (vS) of the lift adjustment in the first operating position (A1) and a speed (vS) of the lift adjustment in the second operating position (A2), and
the ratio is a function of the gradient of the variation of the valve lift guide variable of the lift regulator in the deflection switchover compensation region and/or in the inflection switchover compensation region.

14. The valve gear according to claim 10, wherein
the valve gear has a sensor-based and/or model-based temperature detection installation for detecting an exhaust gas temperature and/or at least one other temperature parameter of the internal combustion engine.

15. The valve gear according to claim 14, wherein
the temperature detection installation is configured for detecting the exhaust gas temperature and/or the at least one other temperature parameter at an engine-distal end of an exhaust manifold and/or on a turbine inlet of a turbine.

16. The valve gear according to claim 15, wherein
the turbine has a variable turbine geometry.

17. A method for operating a variable lift valve gear for a charge-cycle valve of an internal combustion engine, the variable lift valve gear being configured according to claim 10, the method comprising the steps of:
determining an exhaust gas temperature in an operating situation of the internal combustion engine;
determining whether the valve gear in the operating situation is to be switched to a conventional operating mode or to a Miller operating mode, wherein the operating mode to be switched is determined as a function of the determined exhaust gas temperature;
wherein
the exhaust gas temperature is determined at an engine-distal end of an exhaust manifold and/or at a turbine inlet of a turbine of an exhaust gas turbocharger of the internal combustion engine, and/or
wherein the valve gear when reaching or exceeding a limit value of the exhaust gas temperature is switched to the Miller operating mode.

18. The method according to claim 17, wherein
the limit value of the exhaust gas temperature is determined as a function of a material characteristic.

19. The method according to claim 18, wherein
the material characteristic is heat resistance of a turbine material and/or of an exhaust gas path material of the exhaust gas turbocharger.

* * * * *